March 26, 1963 L. C. HANSEN ET AL 3,083,133
METHOD OF MAKING EMBOSSED FACE ACOUSTICAL INSULATION PANEL
Filed Dec. 9, 1957 2 Sheets-Sheet 1
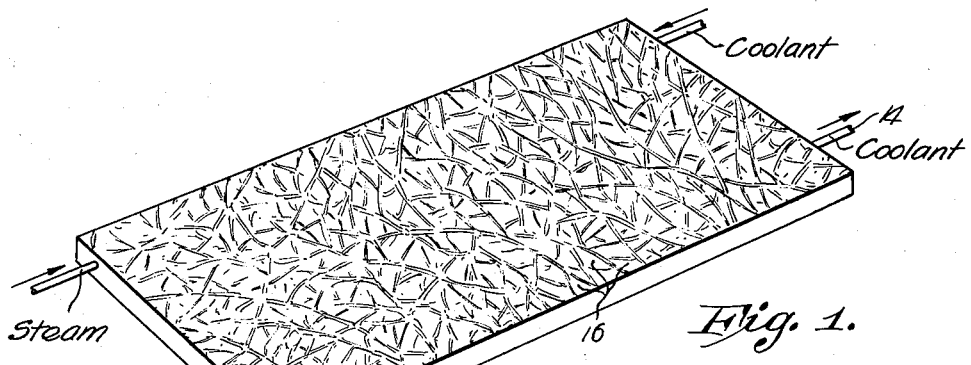
Fig. 1.
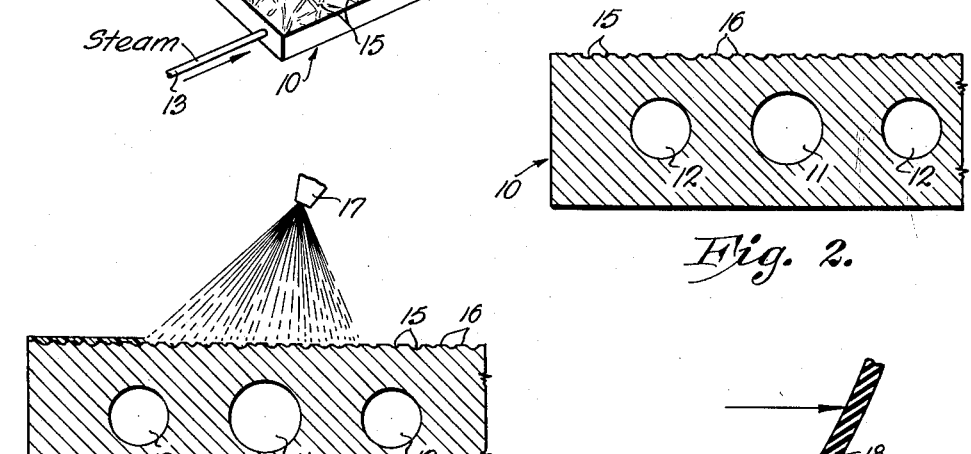
Fig. 2.
Fig. 3.
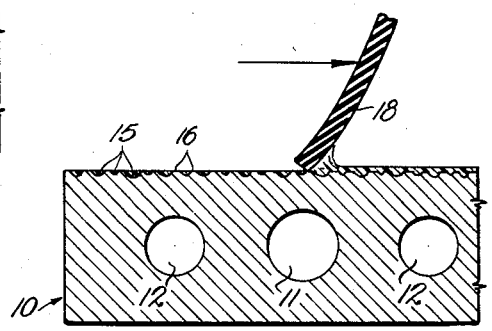
Fig. 4.
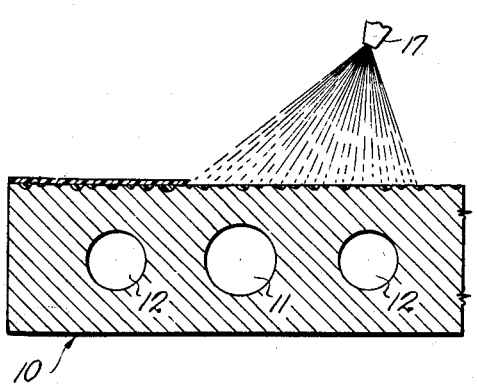
Fig. 5.
INVENTORS.
Mervin F. Browne
Leon C. Hansen
BY
ATTORNEY.

March 26, 1963 L. C. HANSEN ET AL 3,083,133
METHOD OF MAKING EMBOSSED FACE ACOUSTICAL INSULATION PANEL
Filed Dec. 9, 1957 2 Sheets-Sheet 2

INVENTORS.
Mervin F. Browne
Leon C. Hansen
BY
ATTORNEY.

United States Patent Office 3,083,133
Patented Mar. 26, 1963

3,083,133
METHOD OF MAKING EMBOSSED FACE
ACOUSTICAL INSULATION PANEL
Leon C. Hansen and Mervin F. Browne, Kansas City, Mo., assignors to Gustin-Bacon Manufacturing Company, a corporation of Missouri
Filed Dec. 9, 1957, Ser. No. 701,613
2 Claims. (Cl. 156—246)

This invention relates to acoustical insulation paneling and refers more particularly to a method of making an acoustical panel.

The invention covered by this application is in certain respects an improvement over the subject matter of the co-pending application of Joseph F. Stephens, Serial No. 355,850, filed May 18, 1953, now abanodned.

One of the important objects of the present invention is to provide a method of making an acoustical panel which is composed of a main body comprising a resilient and dimensionally stable, light weight fibrous insulation, and a tough resilient plastic coating on at least one face of the insulation, the coating having an embossed pattern which does not detract from either the strength, acoustical properties, or washability of the panel. It is a special feature of the invention that the pattern is made of two or more differently pigmented plastics, one of which serves as a background and the other of which forms an embossed, delicate filigree-like network imposed in sharp relief upon the background and fused integrally therewith.

Another object of the invention is to provide a method of making a tough-faced, highly decorative acoustical panel which is ideally suited for use in drop ceilings, the panel having sufficient inherent resistance to flexural deflection when edge suspended in a horizontal plane as to present a flat ceiling surface.

Other and further objects of the invention together with the features of novelty appurtenant thereto will appear in the course of the following description.

In the accompanying drawings which form a part of the instant specification and are to be read in conjunction therewith, and in which like reference numerals indicate like parts in the various views;

FIG. 1 illustrates schematically a typical mold plate for use in practicing the invention, the plate having a chased or engraved surface presenting a delicate filigree-like design and also provided with connections for heating and cooling the plate;

FIG. 2 is an enlarged fragmentary cross section of the plate of FIG. 1;

Figure 6:
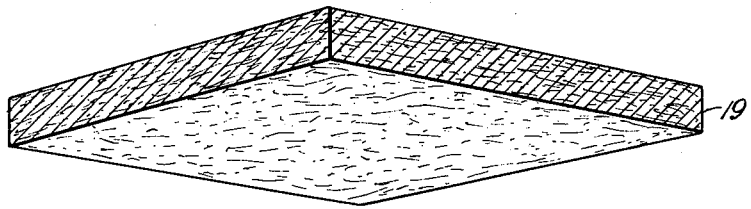
Figure 7:
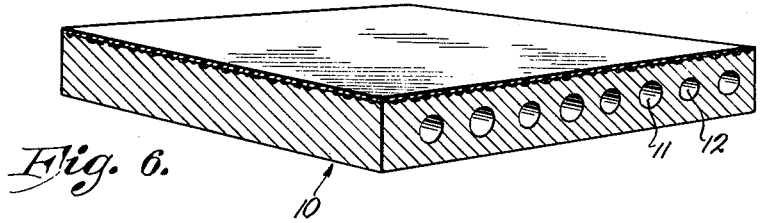
Figure 8:
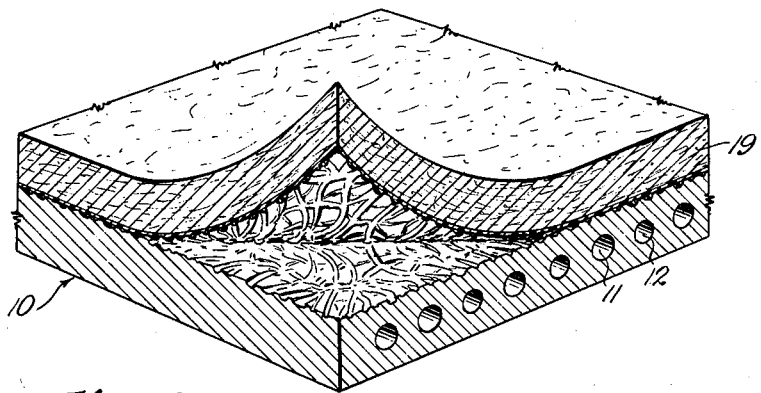

FIGS. 3-8, inclusive, illustrate schematically the steps of the method, with FIG. 8 showing a portion of a preferred form of the final product.

Referring to the drawings, and initially to FIGS. 1 and 2, FIG. 1 shows a mold plate 10 suitable for the present invention. Preferably the plate is formed of metal and is ported for the circulation therethrough, in appropriate passageways or ducts, of fluid heating and cooling mediums. For example, in FIG. 2 passageway 11 may be considered a coolant passageway, and passageways 12 as heating medium passageways. Connections 13 and 14, respectively, supply the passageways 11 and 12 with the mediums involved, for example, being connected with sources of steam for heating and water for cooling.

The plate 10 is preferably provided with a top face of the dimensions of the panel to be formed. One convenient size we have found is 2 feet by 4 feet, although it will be evident that a wide variety of sizes and shapes may be made.

The top face of the plate is etched or engraved with a delicate pattern forming valleys 15 and interposed flat lands 16, with the valleys of 1 to 3 mil depth. The particular pattern illustrated in the drawings is one of intertangled valleys and lands (sometimes referred to as "swirl straw" pattern). It will be understood, however, that this is primarily for the purpose of illustration and should not be construed as the only pattern which might be employed.

In the particular pattern illustrated a highly dramatic and unique effect is obtained if the valleys or grooves 15 of the pattern vary randomly in depth and width, with some quite fine and others more coarse. For the purposes of description we refer to the latter, that is, the deeper and wider grooves as the "major" grooves. The major grooves dominate the pattern, being made more or less continuous and intersecting one another at intervals to present a tangled cord effect. The finer grooves supplement the tangled effect of the course grooves and are somewhat more numerous. The extend in all directions between the major grooves and add to the tangled web effect.

In producing the acoustical panel of this invention the first step (following, of course, engraving or etching of the desired pattern in the face of plate 10) is that illustrated in FIG. 3, namely, the coating of the patterned plate face with a suitable plastic formulation in liquid state. For the purposes of this invention this formulation can most conveniently be a thermoplastic substance, for example, a vinyl chloride polymer coupled with suitable plasticizers and stabilizers. Materials of this type are known generally as plastisols or organisols, depending on the compositions used, and have the property of being easily spreadable and flowable in liquid form, yet capable of being cured by heat and pressure to produce a tough elastic, rubber-like composition which is moisture and air proof. A typical plastisol formulation suitable for our purposes is as follows (percentages by weight of total):

| | Percent |
|---|---|
| Vinyl chloride-vinyl acetate co-polymer (in discrete particles) | 52.10 |
| Dioctyl phthalate | 22.78 |
| Tricresyl phosphate | 16.00 |
| Light stabilizer | 1.72 |
| Heat stabilizer | 0.86 |
| Titanium dioxide | 2.00 |
| Pigment | 4.54 |
| | 100.00 |

The liquid plastiol may be coated on the plate in any desired fashion, but we prefer a spray nozzle as indicated at 17. Enough plastisol is sprayed on the plate to at least fill the valleys or grooves 15 of the pattern up to the plane of the lands 16. As a practical matter, to insure complete filling an excess of plastisol is sprayed on so that the plate is completely coated as indicated in FIG. 3.

Next, the excess plastisol of the initial plate coating is removed by any suitable means, such as, for example the squeegee or wiper 18 of FIG. 4. Care should be taken to see that all of the depressions or valleys 15 of the plate are filled, while the lands 16 or flat portions are wiped clean. The plate is heated to 220° F. (180°–380° F. range) to "dry" or solidify the first coating. Then, the plate is cooled to 100° F. (60°–160° F.) to be ready for the application of the second coating. This "drying" or solidifying of the first coating prevents it from becoming mixed with the second coating, later to be described. The first coating need not be fully cured at this state, however.

After the first coat has been applied as described above, a second plastisol (which may be of the same general formulation as the first) is sprayed on the plate, as illustrated in FIG. 5. This second plastisol is differently colored than the first; thus, if the first plastisol is a green pigmented one, the second may be a beige or off-white, or if the first is a blue, then the second may be an off-white or lighter blue. As would be expected, almost unlimited color combinations are possible. This second layer should be within the range of 1 to 3 mils in thickness.

To complete the formation of the panel there is then superposed (FIG. 6) on the exposed face of the second plastisol a plastic bonded permeable, reticulated glass fiber mat 19, of which more will be said later. The surface of the mat is brought into contact with the coated face of the mold plate 10, and the mat is then subjected to a slight pressure, thus compressing it toward the plate (as shown in FIG. 7), and at the same time the plate is heated to a temperature (280°–380° F.) sufficient to fuse the plastisol completely. After this critical setting or curing temperature has been achieved, the plate mold is then quickly cooled (60°–160° F.) by conducting coolant through the passageways in the plate, and the composite product is stripped from the plate as illustrated in FIG. 8.

The final product is one which has striking appearance characteristics aside from the valuable acoustical properties described in the co-pending application of Joseph F. Stephens earlier referred to. The first plastisol which collected in the grooves and valleys of the plate now appears as a raised or embossed filigree-like pattern superposed on a continuous and contrasting background (the second plastisol) of the same material. By virtue of the chemical union between the first and second plastisols, the fine as well as the major threads or cords of the pattern are integral with the background. The background is firmly adhered to the mat due to its striking into the face of the mat as the mat is pressed thereagainst, thus causing fibers of the mat to become embedded in the coating.

For best acoustical and structural properties, the character and composition of the mat 19 is critical. It should be composed of glass fibers having an average diameter of 10 microns or less, preferably about 4 microns, and the fibers should be distributed in random orientation within the mat. While a completely heterogeneous, three dimensional orientation is not necessary, there should be a substantial portion of fibers extending transversely between the major faces of the mat, although they predominantly may be more or less parallel with the faces. As a bonding agent, a heat reactive material is used and this may be one of a variety of compositions, including, but not necessarily limited to, phenol condensation products, melamine resins, urea formaldehyde resins, urea melamine resins, and vinyl chloride acetate resins. In order to obtain bonding points limited mainly to the points of intersection of the fibers within the mat, the preferable range of percentage of binder is 15% to 35% by weight of the mat, or 17% to 55% based on the weight of the glass fibers. Within these ranges and at the densities hereinafter set forth, the mat will be honeycombed with interstitial air spaces, which are necessary to provide the resiliency contributing to the high acoustical efficiency of the panel. The mat itself should lie in a density range or between 2 and 5 pounds per cubic foot, with 3 pounds per cubic foot being the optimum for panels ¾ inch in thicknesses and 2 x 4 feet in lateral dimensions. At the density and thickness set forth, panels constructed according to the invention require no central support to prevent deflection when the panels are installed in the usual drop ceiling, that is, with the panel supported only at the edges in horizontal planes.

The low density of the fibrous mat, coupled with its high resiliency and dimensional stability, cooperates with the flexible elastic plastic coating to create very favorable acoustical properties. The relatively dense plastic coating is quite effective in acoustical absorption in the lower frequency ranges, say 200 to 250 c.p.s., and the resiliency of the mat makes possible absorption of frequencies in higher ranges and up to, but in decreasing effectiveness, approximately 2,000 c.p.s. The spectrum of sound frequencies in most spaces where acoustical materials are employed, for example, offices, auditoria, etc., is predominantly below 1,000 c.p.s. and hence, a panel having a tough elastic facing according to the invention and which is backed up by a resilient mat material performs very effectiveqly in these locations.

Moreover, the characteristics last mentioned also insure of a panel which can be subjected to rough usage without danger of crushing or breaking. The panels can be produced in any size consistent with practicality of use. It will be evident that the fusion of the filigree-like embossed pattern into a background of like material enables the production of the panels in a variety of colors and designs without detracting from either the structural or acoustical properties of the panel. The panels are of high acoustical efficiency and the facings thereof are highly durable and washable, despite the intricate patterns involved. Moreover, the glass and resin composition produces a flame-proof construction which makes the panels highly suitable for drop ceilings overlaid by an open space.

From the foregoing it will be seen that this invention is one well adapted to attain all of the ends and objects hereinabove set forth together with other advantages which are obvious and which are inherent to the method.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

Having thus described our invention, we claim:

1. A method of making a composite acoustical panel comprising the steps of enchasing the face of a plate member to provide a pattern of grooves separated by flat, co-planar lands, applying to said face a first liquid heat reactive material in sufficient volume to at least fill the grooves to the level of the lands, completely wiping from the lands any excess of said first material to completely expose the lands, heating said first heat reactive material sufficiently to solidify same, applying a second liquid heat reactive material of different color than said first material to said plate to completely coat the lands and exposed areas of said first material, superposing a fibrous mat on said second material and compressing said mat toward said second material with sufficient force to cause said second material to strike partially into said mat, curing said first and second materials whereby to fuse them to one another and to adhere the mat permanently to the heat reactive material, and stripping the composite of mat and heat reactive material from the plate.

2. The method of claim 1 wherein said plate is heated to cure the heat reactive materials and is cooled prior to stripping of the composite therefrom.

References Cited in the file of this patent

UNITED STATES PATENTS

| | | | |
|---|---|---|---|
| 2,045,312 | Roos et al. | June 23, 1936 |
| 2,077,617 | Cramer | Apr. 20, 1937 |
| 2,108,682 | Leslie | Feb. 15, 1938 |
| 2,124,086 | Slidell | July 19, 1938 |
| 2,144,388 | Quasebarth | Jan. 17, 1939 |
| 2,495,636 | Hoeltzel et al. | Jan. 24, 1950 |
| 2,572,470 | Gordon | Oct. 23, 1951 |
| 2,680,699 | Rubin | June 8, 1954 |
| 2,725,271 | Cunningham | Nov. 29, 1955 |
| 2,772,194 | Fisher et al. | Nov. 27, 1956 |
| 2,772,196 | Pooley | Nov. 27, 1956 |
| 2,778,759 | Stephens et al. | Jan. 22, 1957 |
| 2,802,764 | Slayter et al. | Aug. 13, 1957 |